(12) United States Patent
Richey

(10) Patent No.: US 7,263,873 B2
(45) Date of Patent: Sep. 4, 2007

(54) SYSTEM AND METHOD FOR DETECTING LEAKS IN PRESSURIZED PIPING SYSTEMS

(76) Inventor: Robert Charles Richey, 2331 Cliff Dr., Newport Beach, CA (US) 92663

( * ) Notice: Subject to any disclaimer, the term of this patent is extended or adjusted under 35 U.S.C. 154(b) by 49 days.

(21) Appl. No.: 11/072,134

(22) Filed: Mar. 4, 2005

(65) Prior Publication Data

US 2006/0196251 A1    Sep. 7, 2006

(51) Int. Cl.
*G01M 3/08*    (2006.01)

(52) U.S. Cl. ...................................... 73/49.1

(58) Field of Classification Search ................ 73/49.1, 73/40

See application file for complete search history.

(56) References Cited

U.S. PATENT DOCUMENTS

| | | |
|---|---|---|
| 3,940,020 A | 2/1976 | McCrory et al. |
| 4,518,955 A | 5/1985 | Meyer |
| 4,524,607 A | 6/1985 | Pelletier et al. |
| 4,608,857 A * | 9/1986 | Mertens et al. .......... 73/40.5 R |
| 4,854,158 A | 8/1989 | Gates |
| 4,918,975 A | 4/1990 | Voss |
| 5,317,899 A | 6/1994 | Hutchinson et al. |
| 5,850,037 A * | 12/1998 | Mullins .................... 73/40.5 R |
| 6,314,795 B1 | 11/2001 | Ingham |
| 6,549,857 B2 | 4/2003 | Fierro et al. |

FOREIGN PATENT DOCUMENTS

| | | | |
|---|---|---|---|
| FR | 2809489 | 5/2000 | |
| GB | 2282892 | 4/1995 | |
| JP | 63-163252 A * | 7/1988 | .................. 73/49.1 |

* cited by examiner

*Primary Examiner*—Daniel S. Larkin
(74) *Attorney, Agent, or Firm*—James H. Millane

(57) ABSTRACT

A system and method for testing plumbing systems for leaks by which the original plumbing system is cleaned and flushed using ambient temperature water followed by cleaning and flushing with pressurized recirculating elevated temperature water to filter debris and contaminants, shocking the plumbing system with elevated temperature and high pressure surges followed by a hydrostatic pressure test designed to expose the existence of any leaks in the plumbing system in the rough plumbing stage of construction prior to enclosing the plumbing system in a structure.

17 Claims, 1 Drawing Sheet

DETAILED DESCRIPTION OF THE DRAWINGS

1. Connect the system to a water source and the plumbing system to be tested
2. Fill system and plumbing system with water source at available water pressure at ambient temperature
3. Purge system and plumbing system of air and filter debris
4. Circulate ambient temperature water and observe clean flowing water from system and plumbing system
5. Close system and plumbing system with valves to allow available pressure to build to a first pressure level
6. Once plumbing system is pressurized, begin heating water source
7. Once water source is heated to an elevated temperature, begin water source re-circulation through plumbing system
8. Purge system and plumbing system of any remaining air
9. Allow system water source to reach elevated temperature
10. Once system and plumbing system are heated to an elevated temperature, the water is allowed to re-circulate and debris and other contaminants are filtered out of the re-circulating plumbing system
11. Turn off water heating and re-circulation of water through system and plumbing system
12. Isolate hydrostatic pump with valves from system and plumbing system
13. Activate hydrostatic pump to elevate pressure up to 400 pounds per square inch
14. Introduce elevated pressurized water to system and plumbing system
15. Open and close valves to expose plumbing system to pulsating pressure to shock the plumbing system
16. Repeat plumbing system exposure to pulsating pressure several times, each time allowing the plumbing system pressure to rise incrementally
17. Stabilize plumbing system pressure just above desired static test pressure for the plumbing system
18. Lower system pressure to desired static test pressure for plumbing system
19. Maintain plumbing system static pressure test for period of time
20. Physically inspect all plumbing system joints and repair as needed
21. Re-inspect plumbing system as needed to insure system integrity
22. Remove system test from plumbing system

DETAILED DESCRIPTION OF THE DRAWINGS

1. Connect the system to a water source and the plumbing system to be tested
2. Fill system and plumbing system with water source at available water pressure at ambient temperature
3. Purge system and plumbing system of air and filter debris
4. Circulate ambient temperature water and observe clean flowing water from system and plumbing system
5. Close system and plumbing system with valves to allow available pressure to build to a first pressure level
6. Once plumbing system is pressurized, begin heating water source
7. Once water source is heated to an elevated temperature, begin water source re-circulation through plumbing system
8. Purge system and plumbing system of any remaining air
9. Allow system water source to reach elevated temperature
10. Once system and plumbing system are heated to an elevated temperature, the water is allowed to re-circulate and debris and other contaminants are filtered out of the re-circulating plumbing system
11. Turn off water heating and re-circulation of water through system and plumbing system
12. Isolate hydrostatic pump with valves from system and plumbing system
13. Activate hydrostatic pump to elevate pressure up to 400 pounds per square inch
14. Introduce elevated pressurized water to system and plumbing system
15. Open and close valves to expose plumbing system to pulsating pressure to shock the plumbing system
16. Repeat plumbing system exposure to pulsating pressure several times, each time allowing the plumbing system pressure to rise incrementally
17. Stabilize plumbing system pressure just above desired static test pressure for the plumbing system
18. Lower system pressure to desired static test pressure for plumbing system
19. Maintain plumbing system static pressure test for period of time
20. Physically inspect all plumbing system joints and repair as needed
21. Re-inspect plumbing system as needed to insure system integrity
22. Remove system test from plumbing system

Figure 1

SYSTEM AND METHOD FOR DETECTING LEAKS IN PRESSURIZED PIPING SYSTEMS

BACKGROUND OF THE INVENTION

The present invention generally relates to enhancing and improving current procedures for testing the integrity of newly installed water distribution systems for the purpose of preventing and eliminating water leaks caused by bad solder joints, bad glue joints, internal impurities or improper piping assembly. The present invention also relates to metal or plastic plumbing systems and may be used in domestic plumbing systems and commercial plumbing applications including fire sprinkler applications.

Past history has shown that leaks caused by bad solder or glue joints cause significant property damage and cost of repairs, mold and mold remediation, insurance claims, loss of goodwill with the plumbing system purchaser and the plumbing system installer, and increased workloads and stress on plumbing installation service departments and operations. In the context of new construction, major property damage and loss claims result when plumbing systems fail due to bad solder joints, glue joints, defective material, material damaged by others or faulty plumbing system installations after the plumbing systems have been covered with drywall or other wall coverings.

By way of background, current pressurized piping systems are often inadequately tested during their installation to determine whether any compromised pipe joints or piping components exist before they are placed into service. Often, the piping system contains contaminants from the installation process which over time can cause problems with regard to leaks being exposed due to internal contamination and intermittent use. Plumbing system contaminants can clog or foul plumbing fixtures over time if not removed from the plumbing system.

In the context of original home construction, plumbing systems are often left stagnant for periods of time prior to initial use and more often filled with debris. Plumbing systems can contain two hundred or more solder joints or connections. The type of debris typically found in these systems includes solder, flux, glue and other construction debris. Excess flux used in the soldering process can give the appearance under normal testing conditions that there are no leaks or voids in the plumbing joints. However, after time and use, flux can be rinsed out of the system, giving rise to leaks often long after the original installation. Also, repeated expansion and contraction of the plumbing system due to thermal expansion stresses can cause joint fatigue and often results in joint failure.

The present invention utilizes means by which the original rough plumbing system is first flushed with recirculating ambient temperature water to remove the initial debris and contaminants from the system followed by recirculating elevated temperature water which is passed through a filter to remove the finer debris and contaminants. The plumbing system is then isolated and exposed to elevated temperature and high pressure water surges culminating with a hydrostatic pressure test designed to expose the existence of any leaks in the plumbing system in the rough plumbing stage of construction prior to enclosing the plumbing system in the structure.

Heretofore, the methods employed to test a plumbing system normally involved exposing the plumbing system to an elevated hydrostatic pressure test to expose any leaks. Plumbing codes typically require plumbing systems to be pressure tested at water pressure not less than the working pressure for the system or an air pressure test not to exceed fifty (50) pounds per square inch for a minimum of fifteen minutes. Both tests require the system to be leak free for a period of not less than fifty minutes.

The present invention is vastly superior to existing leak testing systems since it flushes the plumbing system free of debris and excess flux with elevated temperature water, shocks the system with pressure pulsations to expose any inadequate piping joints and hydrostatically pressure tests the system at an elevated temperature to expose any plumbing system deficiencies. The prior art methods for testing plumbing systems suffer drawbacks in that they are individually inadequate to provide the level of test security for the plumbing system and, in most instances, are not employed in leak detection methods.

SUMMARY OF THE INVENTION

It is an objective of this invention to provide both a leak detection system and method which enables plumbing system installers to ensure their plumbing systems are free of debris, excess flux and other residue, and whose joints do not contain any voids or other inadequacies which may give rise to a leak after the plumbing systems is enclosed.

Another objective of this invention is to provide a leak detection system and method which is both rugged and durable, as well as being both easy and relatively inexpensive to operate and maintain.

A still further object of this invention is to provide a leak detection system and method which allows for relatively quick plumbing system leak testing which affords a high degree of reliability.

The present invention comprises both a system and a method for identifying and eliminating debris and contamination in a new plumbing system and identifying one or more leaky plumbing system components from among a plurality of plumbing pipes and fittings. The present invention employs a water source, a conduit means for connecting the water source to the plumbing system, a pumping means for re-circulating the water through the plumbing system, a filtering means for cleansing and removing debris and contaminants from the plumbing system, a heating means for applying heat to the water source to elevate its temperature, a flow restriction means for isolating portions of the plumbing system, a pressure elevating means for increasing the pressure of the plumbing system, a means for measuring the plumbing system pressure and a pressure pulsating means for applying intermittent pressure surges to shock the plumbing system.

The conduit means described could be accomplished by the use of low pressure hoses. The pumping means described could be accomplished by the use of a re-circulating pump. The filtering means described could be accomplished by the use of a sediment and debris filter. The heating means described could be accomplished by the use of a conventional tank water heater or an instantaneous tankless water heater. The flow restriction means described could be accomplished by the use of a system of valves. The means for measuring the plumbing system pressure described could be accomplished by the use of pressure gauges. The pressure pulsating and elevation means described could be accomplished by the use of a hydrostatic pump.

A preferred embodiment of the present invention includes a method for detecting a leak in a plumbing system before it is enclosed wherein elevated temperature water is fed through a pressure regulating device, recirculating pump and a sediment and debris filter to fill, flush and filter the water through the plumbing system for a fixed period of time at a first pressure level. After the flush and filter operations are performed, the elevated temperature water, pressure regulating device, recirculating pump and sediment and debris filter are isolated. A high pressure hydrostatic pump is activated and allowed to surge at elevated pressure over time repeatedly to shock the system. Thereafter, the plumbing system is pressurized to a test pressure level for an extended period of time to determine if any pressure drop occurs which would indicate a plumbing system leak. Leaks or other plumbing system deficiencies are noted and corrected before enclosing the plumbing system.

The system comprising this invention is obtained by forming a plumbing test system wherein a water heater is connected to a pressure regulator, recirculating pump, sediment and debris filter and a hydrostatic pump through a series of pipes and valves from high pressure hoses connected to the plumbing system to be tested. The water heater can be an electric heater, conventional gas fired heater, instantaneous propane gas heater or any other means for delivering elevated temperature water or other fluid. A water temperature range of between 80° F. and 140° F. is desired. The pressure regulator can be a standard mechanical pressure regulator used in residential or commercial settings. The recirculating pump can be a standard recirculation pump used in residential or commercial applications and may be electrically driven. The sediment and debris filter can be a standard filter used in residential or commercial applications or may be made of stainless steel. The valves utilized can be the standard type used in residential or commercial applications and include a pressure relief valve, a check valve, a temperature and pressure relief valve and a drain valve. Quick disconnect fittings are utilized to allow for easy system component replacement. The hydrostatic pump can be the type normally used in residential or commercial applications and should be able to obtain pressures of 300 pounds per square inch (psi) or greater.

The forgoing system is utilized to practice the method of this invention by exposing the plumbing system to be tested to recirculating water which is fed through a pressure regulating device, recirculating pump and a sediment and debris filter to preliminarily fill, flush and filter the water through the plumbing system for a fixed period of time or until it becomes clear to the eye that water is clear of debris and air. Thereafter, this procedure is repeated with the introduction of elevated temperature water to enhance the filtration process. After the flush and filter operations are performed, the elevated temperature water, pressure regulating device, recirculating pump and sediment and debris filter are isolated with valves. A high pressure hydrostatic pump is activated and allowed to surge at elevated pressure over time repeatedly to shock the system. The elevated pressure should not exceed 400 pounds per square inch. Thereafter, the plumbing system is hydrostatically pressurized for an extended period of time to determine if any pressure drop occurs which would indicate a plumbing system leak. The hydrostatic test pressure is held for a minimum of sixty minutes at 300 psi for metal piping, and 130 psi for sixty minutes for plastic piping or pressure not to exceed the pipe manufacturers recommended testing procedures. Leaks or other plumbing system deficiencies are noted and corrected before enclosing the plumbing system. The method of this invention may be used repeatedly on the plumbing system to be tested until it is confirmed no problems exist.

BRIEF DESCRIPTION OF THE DRAWINGS

So this invention is more clearly understood, reference is now made to the accompanying drawing wherein FIG. 1 is a flow chart of the method in which the invention relates.

DETAILED DESCRIPTION OF THE PREFERRED EMBODIMENT

Referring now to FIG. 1, the method of the present invention is briefly described in a flow chart. The method begins by connecting the system and plumbing system to a water source (block 1). The system and plumbing system are then filled with the water source at available pressure (block 2). Air and debris are then filtered and purged from system and plumbing system (block 3). The system and plumbing system are observed until clean water is seen flowing through the system and plumbing system (block 4). The system and plumbing system are then closed with valves to allow available pressure to build in the system and plumbing system (block 5). Once the system and plumbing system are pressurized, the water source is heated to an elevated temperature (block 6). The elevated temperature water source is then re-circulated through the plumbing system to remove debris and contaminants from the plumbing system (block 7). Any remaining air in the closed plumbing system is then bled or purged from the plumbing system (block 8). Additional heat is then added to the closed plumbing system until it reaches an elevated temperature (block 9). Debris and other contaminants are then filtered out of the plumbing system (block 10). The water heating and plumbing system water re-circulation are turned off (block 11). The system's hydrostatic pump is isolated from the system and plumbing system with valves (block 12). The hydrostatic pump is activated to elevate the plumbing system pressure to 300 to 400 psi maximum for metal piping and 130 psi for plastic piping or pressure not to exceed the pipe manufacturers recommended testing procedures (block 13). The elevated pressure is introduced to the system and plumbing system (block 14). Valves are opened and closed exposing the system and plumbing system to pulsating pressure to shock the plumbing system (block 15). The plumbing system is repeatedly exposed to the pulsating pressure multiple times each allowing the pressure to rise incrementally (block 16). The plumbing system pressure is then stabilized to a pressure greater than the desired static test pressure for the plumbing system (block 17). The plumbing system pressure is then lowered to desired static test pressure (block 18). The plumbing system is then exposed to the desired static pressure test for a period of time (block 19). The plumbing system is then physically inspected to ensure the plumbing system is free from leaks and plumbing system joints are repaired as needed (block 20). The plumbing system is then re-inspected to insure system integrity (block 21). The system is then removed from the plumbing system (block 22).

Although the present invention has been described above in terms of a specific embodiment, it is anticipated that alterations and modifications thereof will no doubt become apparent to those skilled in the art. It is therefore intended that the following claims be interpreted as covering all such alterations and modifications as fall within the spirit and scope of the invention.

What is claimed is:

1. A method for use in detecting leaks in a pressurized plumbing system, comprising the steps (of):

(a) introducing a water source to said plumbing system to allow removal of air and loose debris from said plumbing system;
(b) isolating said plumbing system and pressurizing said plumbing system to a first pressure level;
(c) applying heat to said water source to increase its temperature to a temperature level;
(d) filtering debris and contaminants from said plumbing system by employing a filtering device;
(e) isolating said plumbing system and exposing it to elevated temperature water and intermittent pressure fluctuations in increasing pressure increments thereby shocking said plumbing system for a repeated period of time;
(f) pressurizing said plumbing system to a test pressure level;
(g) maintaining said test pressure for a predetermined period of time and;
(h) inspecting said plumbing systems for leaks or a pressure drop.

2. The method as set forth in claim 1 wherein said first pressure level is 300 psi or greater.

3. The method as set forth in claim 1 wherein said temperature level ranges from 800° F. to 140° F.

4. The method as set forth in claim 1 wherein said filtering device is a sediment and debris filter.

5. The method as set forth in claim 1 wherein said test pressure level ranges from 130 to 300 psi.

6. The method as set forth in claim 1 wherein said (predetermined) period of time is at least sixty minutes.

7. A system for use in detecting leaks in a pressurized plumbing system comprising:
(a) a water source;
(b) a conduit means for connecting said water source to said plumbing system;
(c) a pumping means for recirculating said water through said plumbing system;
(d) a filtering means for cleansing and removing debris and contaminants from said plumbing system;
(e) a heating means for applying heat to said water source to elevate its temperature;
(f) a pumping means for elevating the pressure of said plumbing system;
(g) a flow restriction means for isolating portions of said plumbing system;
(h) a means for measuring pressure of said plumbing system and;
(i) a pressure pulsating means for applying intermittent pressure surges to said plumbing system.

8. The system as set forth in claim 7 wherein said conduit means is a high pressure hose.

9. The system as set forth in claim 7 wherein said pumping means is a recirculating pump.

10. The system as set forth in claim 7 wherein said filtering means is a sediment and debris filter.

11. The system as set forth in claim 7 wherein said heating means is a conventional tank water heater.

12. The system as set forth in claim 7 wherein said heating means is an instantaneous tankless water heater.

13. The system as set forth in claim 7 wherein said flow restriction means is a system of valves.

14. The system as set forth in claim 7 wherein said pressure pulsating means is a hydrostatic pump.

15. The system as set forth in claim 7 wherein said conduit means is a low pressure hose.

16. The system as set forth in claim 7 wherein said pumping means for elevating pressure is a hydrostatic pump.

17. The system as set forth in claim 7 wherein said means for measuring pressure is a pressure gauge.

* * * * *

UNITED STATES PATENT AND TRADEMARK OFFICE
CERTIFICATE OF CORRECTION

| | |
|---|---|
| PATENT NO. | : 7,263,873 B2 |
| APPLICATION NO. | : 11/072134 |
| DATED | : September 4, 2007 |
| INVENTOR(S) | : Robert Charles Richey |

It is certified that error appears in the above-identified patent and that said Letters Patent is hereby corrected as shown below:

In the Claims, Column 5, Claim 3, line 24, "800° F." should be changed to --80° F.--.

Signed and Sealed this

Seventeenth Day of June, 2008

JON W. DUDAS
*Director of the United States Patent and Trademark Office*